United States Patent
Araujo et al.

(10) Patent No.: US 12,476,488 B2
(45) Date of Patent: Nov. 18, 2025

(54) ENERGY TRANSFER SYSTEM AND RECEPTION UNIT FOR THE WIRELESS TRANSCUTANEOUS TRANSFER OF ENERGY

(71) Applicant: KARDION GMBH, Stuttgart (DE)

(72) Inventors: Samuel Vasconcelos Araujo, Esslingen (DE); Michael Jiptner, Besigheim (DE)

(73) Assignee: Kardion GmbH, Stuttgart (DE)

( * ) Notice: Subject to any disclaimer, the term of this patent is extended or adjusted under 35 U.S.C. 154(b) by 538 days.

(21) Appl. No.: 17/051,406

(22) PCT Filed: May 2, 2019

(86) PCT No.: PCT/EP2019/061319
§ 371 (c)(1),
(2) Date: Oct. 28, 2020

(87) PCT Pub. No.: WO2019/211413
PCT Pub. Date: Nov. 7, 2019

(65) Prior Publication Data
US 2022/0320901 A1 Oct. 6, 2022

(30) Foreign Application Priority Data
May 2, 2018 (DE) .......................... 102018206727.9

(51) Int. Cl.
*H02J 50/10* (2016.01)
*A61M 60/875* (2021.01)
(Continued)

(52) U.S. Cl.
CPC ........... *H02J 50/10* (2016.02); *A61M 60/875* (2021.01); *A61N 1/3787* (2013.01); *H02J 50/90* (2016.02);
(Continued)

(58) Field of Classification Search
CPC .................................................. A61M 60/873
See application file for complete search history.

(56) References Cited

U.S. PATENT DOCUMENTS

| 2,254,698 A | 9/1941 | Hansen, Jr. |
| 3,085,407 A | 4/1963 | Tomlinson |

(Continued)

FOREIGN PATENT DOCUMENTS

| CA | 3 000 581 | 4/2017 |
| CN | 103143072 | 6/2013 |

(Continued)

OTHER PUBLICATIONS

International Preliminary Report on Patentability and Written Opinion received in PCT/EP2019/061319, dated Nov. 12, 2020 in 8 pages.

(Continued)

*Primary Examiner* — Tynese V McDaniel
(74) *Attorney, Agent, or Firm* — Knobbe, Martens, Olson & Bear, LLP (57) ABSTRACT

An energy transfer system for wireless energy transfer includes a transmitter unit having a primary coil supplied with a supply voltage and a receiver unit separate from the transmitter unit having a secondary coil to which a DC link capacitor is connected by a rectifier. The energy transfer system further includes a first device configured to determine a value of a DC link voltage applied on the DC link capacitor when the supply voltage is applied on the primary coil, and a second device configured to perform at least one function based on the determined value of the DC link voltage or a variable derived therefrom. A receiver unit is configured to interact for wireless energy transfer with a transmitter unit separate from the receiver unit.

16 Claims, 2 Drawing Sheets

(51) Int. Cl.
*A61N 1/378* (2006.01)
*H02J 50/90* (2016.01)
*H02M 5/458* (2006.01)

(52) U.S. Cl.
CPC .. *H02M 5/4585* (2013.01); *A61M 2205/8243* (2013.01)

(56) References Cited

U.S. PATENT DOCUMENTS

| | | | |
|---|---|---|---|
| 3,614,181 A | 10/1971 | Meeks | |
| 3,645,268 A | 2/1972 | Capote | |
| 3,747,998 A | 7/1973 | Klein et al. | |
| 3,790,878 A | 2/1974 | Brokaw | |
| 3,807,813 A | 4/1974 | Milligan | |
| 4,441,210 A * | 4/1984 | Hochmair | A61N 1/3787 324/207.16 |
| 4,888,009 A | 12/1989 | Lederman et al. | |
| 4,888,011 A | 12/1989 | Kung et al. | |
| 4,896,754 A | 1/1990 | Carlson et al. | |
| 5,000,177 A | 3/1991 | Hoffmann et al. | |
| 5,195,877 A | 3/1993 | Kletschka | |
| 5,289,821 A | 3/1994 | Swartz | |
| 5,443,503 A | 8/1995 | Yamane | |
| 5,599,173 A | 2/1997 | Chen et al. | |
| 5,613,935 A | 3/1997 | Jarvik | |
| 5,629,661 A | 5/1997 | Ooi et al. | |
| 5,690,674 A | 11/1997 | Diaz | |
| 5,702,430 A | 12/1997 | Larson, Jr. et al. | |
| 5,713,954 A | 2/1998 | Rosenberg et al. | |
| 5,766,207 A | 6/1998 | Potter et al. | |
| 5,814,900 A | 9/1998 | Esser | |
| 5,843,141 A | 12/1998 | Bischoff et al. | |
| 5,888,242 A | 3/1999 | Antaki et al. | |
| 5,982,153 A * | 11/1999 | Nagai | H02J 7/02 363/47 |
| 6,053,873 A | 4/2000 | Govari et al. | |
| 6,058,958 A | 5/2000 | Benkowski et al. | |
| 6,149,405 A | 11/2000 | Abe et al. | |
| 6,212,430 B1 * | 4/2001 | Kung | A61M 60/178 607/61 |
| 6,224,540 B1 | 5/2001 | Lederman et al. | |
| 6,254,359 B1 | 7/2001 | Aber | |
| 6,264,601 B1 | 7/2001 | Jassawalla et al. | |
| 6,324,430 B1 | 11/2001 | Zarinetchi et al. | |
| 6,324,431 B1 | 11/2001 | Zarinetchi et al. | |
| 6,361,292 B1 | 3/2002 | Chang et al. | |
| 6,366,817 B1 | 4/2002 | Kung | |
| 6,389,318 B1 | 5/2002 | Zarinetchi et al. | |
| 6,398,734 B1 | 6/2002 | Cimochowski et al. | |
| 6,400,991 B1 | 6/2002 | Kung | |
| 6,442,434 B1 | 8/2002 | Zarinetchi et al. | |
| 6,445,956 B1 | 9/2002 | Laird et al. | |
| 6,471,713 B1 | 10/2002 | Vargas et al. | |
| 6,496,733 B2 | 12/2002 | Zarinetchi et al. | |
| 6,508,756 B1 | 1/2003 | Kung et al. | |
| 6,516,227 B1 | 2/2003 | Meadows et al. | |
| 6,527,698 B1 | 3/2003 | Kung et al. | |
| 6,530,876 B1 | 3/2003 | Spence | |
| 6,540,658 B1 | 4/2003 | Fasciano et al. | |
| 6,553,263 B1 | 4/2003 | Meadows et al. | |
| 6,561,975 B1 | 5/2003 | Pool et al. | |
| 6,592,620 B1 | 7/2003 | Lancisi et al. | |
| 6,979,338 B1 | 12/2005 | Loshakove et al. | |
| 7,062,331 B2 | 6/2006 | Zarinetchi et al. | |
| 7,070,398 B2 | 7/2006 | Olsen et al. | |
| 7,155,291 B2 | 12/2006 | Zarinetchi et al. | |
| 7,160,243 B2 | 1/2007 | Medvedev | |
| 7,338,521 B2 | 3/2008 | Antaki et al. | |
| 7,513,864 B2 | 4/2009 | Kantrowitz et al. | |
| 7,520,850 B2 | 4/2009 | Brockway | |
| 7,762,941 B2 | 7/2010 | Jarvik | |
| 7,794,384 B2 | 9/2010 | Sugiura et al. | |
| 7,819,916 B2 | 10/2010 | Yaegashi | |
| 7,942,805 B2 | 5/2011 | Shambaugh, Jr. | |
| 7,959,551 B2 | 6/2011 | Jarvik | |
| 8,012,079 B2 | 9/2011 | Delgado, III | |
| 8,075,472 B2 | 12/2011 | Zilbershlag et al. | |
| 8,088,059 B2 | 1/2012 | Jarvik | |
| 8,231,519 B2 | 7/2012 | Reichenbach et al. | |
| 8,461,817 B2 | 6/2013 | Martin et al. | |
| 8,489,200 B2 | 7/2013 | Zarinetchi et al. | |
| 8,608,635 B2 * | 12/2013 | Yomtov | A61M 60/873 623/3.28 |
| 8,612,002 B2 * | 12/2013 | Faltys | A61N 1/3756 607/116 |
| 8,620,447 B2 | 12/2013 | D'Ambrosio et al. | |
| 8,766,788 B2 | 7/2014 | D'Ambrosio | |
| 8,827,890 B2 | 9/2014 | Lee et al. | |
| 8,862,232 B2 | 10/2014 | Zarinetchi et al. | |
| 8,870,739 B2 | 10/2014 | LaRose et al. | |
| 8,900,114 B2 | 12/2014 | Tansley et al. | |
| 8,961,389 B2 | 2/2015 | Zilbershlag | |
| 9,002,468 B2 | 4/2015 | Shea et al. | |
| 9,002,469 B2 | 4/2015 | D'Ambrosio | |
| 9,071,182 B2 * | 6/2015 | Yoshida | H02P 29/0241 |
| 9,220,826 B2 | 12/2015 | D'Ambrosio | |
| 9,283,314 B2 | 3/2016 | Prasad et al. | |
| 9,364,592 B2 | 6/2016 | McBride | |
| 9,381,286 B2 | 7/2016 | Spence et al. | |
| 9,427,509 B2 | 8/2016 | Vodermayer | |
| 9,440,013 B2 | 9/2016 | Dowling et al. | |
| 9,456,898 B2 | 10/2016 | Barnes et al. | |
| 9,486,566 B2 | 11/2016 | Siess | |
| 9,492,600 B2 | 11/2016 | Strueber et al. | |
| 9,539,094 B2 | 1/2017 | Dale et al. | |
| 9,561,362 B2 | 2/2017 | Malinowski | |
| 9,569,985 B2 | 2/2017 | Alkhatib et al. | |
| 9,592,397 B2 | 3/2017 | Hansen et al. | |
| 9,603,984 B2 | 3/2017 | Romero et al. | |
| 9,616,107 B2 | 4/2017 | VanAntwerp et al. | |
| 9,713,701 B2 | 7/2017 | Sarkar et al. | |
| 9,717,831 B2 | 8/2017 | Schuermann | |
| 9,724,083 B2 | 8/2017 | Quadri et al. | |
| 9,800,172 B1 | 10/2017 | Leabman | |
| 9,833,314 B2 | 12/2017 | Corbett | |
| 9,833,611 B2 | 12/2017 | Govea et al. | |
| 9,848,899 B2 | 12/2017 | Sliwa et al. | |
| 9,974,894 B2 | 5/2018 | Morello | |
| 10,010,412 B2 | 7/2018 | Taft | |
| 10,143,571 B2 | 12/2018 | Spence et al. | |
| 10,148,126 B2 * | 12/2018 | Hoarau | A61M 60/216 |
| 10,463,508 B2 | 11/2019 | Spence et al. | |
| 10,732,583 B2 | 8/2020 | Rudser | |
| 10,944,293 B2 | 3/2021 | Nakao | |
| 11,000,282 B2 | 5/2021 | Schuelke et al. | |
| 11,056,878 B2 | 7/2021 | Gao et al. | |
| 11,065,437 B2 | 7/2021 | Aber et al. | |
| 11,071,857 B2 | 7/2021 | Sun | |
| 11,103,715 B2 | 8/2021 | Fort | |
| 11,110,265 B2 | 9/2021 | Johnson | |
| 11,121,580 B2 * | 9/2021 | Partovi | H02J 50/402 |
| 11,179,559 B2 | 11/2021 | Hansen | |
| 11,224,737 B2 | 1/2022 | Petersen et al. | |
| 11,266,502 B1 | 3/2022 | Wallace | |
| 11,291,826 B2 | 4/2022 | Tuval et al. | |
| 11,316,371 B1 | 4/2022 | Partovi et al. | |
| 11,317,988 B2 | 5/2022 | Hansen et al. | |
| 11,344,717 B2 | 5/2022 | Kallenbach et al. | |
| 11,351,359 B2 | 6/2022 | Clifton et al. | |
| 11,351,360 B2 | 6/2022 | Rudser et al. | |
| 11,368,081 B2 | 6/2022 | Vogt et al. | |
| 11,369,785 B2 | 6/2022 | Callaway et al. | |
| 11,369,786 B2 | 6/2022 | Menon et al. | |
| 11,389,641 B2 | 7/2022 | Nguyen et al. | |
| 11,406,483 B2 | 8/2022 | Wirbisky et al. | |
| 11,406,520 B2 | 8/2022 | Lam | |
| 11,406,802 B2 | 8/2022 | DeGraaf et al. | |
| 11,413,443 B2 | 8/2022 | Hodges et al. | |
| 11,413,444 B2 | 8/2022 | Nix et al. | |
| 11,439,806 B2 | 9/2022 | Kimball et al. | |
| 11,471,692 B2 | 10/2022 | Aghassian et al. | |
| 11,497,906 B2 | 11/2022 | Grace et al. | |
| 11,517,737 B2 | 12/2022 | Struthers et al. | |

(56) References Cited

U.S. PATENT DOCUMENTS

| | | |
|---|---|---|
| 11,517,738 B2 | 12/2022 | Wisniewski |
| 11,517,740 B2 | 12/2022 | Agarwa et al. |
| 11,529,508 B2 | 12/2022 | Jablonsk et al. |
| 11,583,671 B2 | 2/2023 | Nguyen et al. |
| 11,596,727 B2 | 3/2023 | Siess et al. |
| 11,602,624 B2 | 3/2023 | Siess et al. |
| 11,616,397 B2 * | 3/2023 | Schilling ............. H01F 38/14 307/104 |
| 11,642,512 B2 * | 5/2023 | Schilling ............ A61M 60/871 600/16 |
| 11,682,924 B2 | 6/2023 | Hansen et al. |
| 11,689,057 B2 | 6/2023 | Hansen |
| 11,699,551 B2 | 7/2023 | Diekhans et al. |
| 11,745,005 B2 | 9/2023 | Delgado, III |
| 11,752,354 B2 | 9/2023 | Stotz et al. |
| 11,804,767 B2 | 10/2023 | Vogt et al. |
| 11,881,721 B2 | 1/2024 | Araujo et al. |
| 11,996,699 B2 | 5/2024 | Vasconcelos Araujo et al. |
| 12,102,835 B2 | 10/2024 | Stotz et al. |
| 12,150,647 B2 | 11/2024 | Schuelke et al. |
| 12,230,868 B2 | 2/2025 | Wenning et al. |
| 12,233,250 B2 | 2/2025 | Stotz et al. |
| 12,400,788 B2 | 8/2025 | Diekhans et al. |
| 12,403,296 B2 | 9/2025 | Baumbach et al. |
| 2001/0016686 A1 | 8/2001 | Okada et al. |
| 2002/0177324 A1 * | 11/2002 | Metzler ................ H01L 29/861 438/719 |
| 2003/0040765 A1 | 2/2003 | Breznock |
| 2003/0125766 A1 | 7/2003 | Ding |
| 2003/0130581 A1 | 7/2003 | Salo et al. |
| 2004/0034411 A1 | 2/2004 | Quijano |
| 2004/0124979 A1 | 7/2004 | Medema |
| 2004/0167410 A1 | 8/2004 | Hettrick |
| 2005/0006083 A1 | 1/2005 | Chen et al. |
| 2005/0107658 A1 | 5/2005 | Brockway |
| 2005/0107847 A1 * | 5/2005 | Gruber ................ A61N 1/3787 607/33 |
| 2006/0004423 A1 | 1/2006 | Boveja et al. |
| 2006/0190036 A1 | 8/2006 | Wendel et al. |
| 2006/0196277 A1 | 9/2006 | Allen et al. |
| 2006/0217785 A1 * | 9/2006 | Matei ................ A61N 1/3787 607/61 |
| 2007/0129767 A1 | 6/2007 | Wahlstrand |
| 2007/0282209 A1 | 12/2007 | Lui et al. |
| 2008/0015481 A1 | 1/2008 | Bergin et al. |
| 2008/0079392 A1 | 4/2008 | Baarman et al. |
| 2008/0082005 A1 | 4/2008 | Stern et al. |
| 2008/0211455 A1 | 9/2008 | Park et al. |
| 2008/0238364 A1 | 10/2008 | Weber |
| 2008/0266922 A1 * | 10/2008 | Mumtaz ............. H01L 27/1203 257/E21.547 |
| 2009/0004037 A1 | 1/2009 | Ito |
| 2009/0010462 A1 * | 1/2009 | Ekchian ............... H02J 7/0029 320/137 |
| 2009/0024042 A1 | 1/2009 | Nunez et al. |
| 2009/0134711 A1 | 5/2009 | Issa et al. |
| 2009/0198307 A1 | 8/2009 | Mi et al. |
| 2009/0198312 A1 | 8/2009 | Barker |
| 2009/0276016 A1 | 11/2009 | Phillips et al. |
| 2009/0312650 A1 | 12/2009 | Maile et al. |
| 2010/0010582 A1 | 1/2010 | Carbunaru |
| 2010/0191035 A1 | 7/2010 | Kang et al. |
| 2010/0219967 A1 | 9/2010 | Kaufmann |
| 2010/0280568 A1 | 11/2010 | Bulkes et al. |
| 2010/0312310 A1 | 12/2010 | Meskens |
| 2010/0331918 A1 | 12/2010 | Digiore et al. |
| 2010/0331920 A1 | 12/2010 | Digiore et al. |
| 2011/0004278 A1 * | 1/2011 | Aghassian ............ H02J 50/90 607/61 |
| 2011/0034874 A1 | 2/2011 | Reitan |
| 2011/0071336 A1 | 3/2011 | Yomtov |
| 2011/0137394 A1 | 6/2011 | Lunsford et al. |
| 2011/0196452 A1 * | 8/2011 | Forsell ................ H02J 50/80 607/60 |
| 2011/0224720 A1 | 9/2011 | Kassab et al. |
| 2012/0019201 A1 | 1/2012 | Peterson |
| 2012/0022645 A1 | 1/2012 | Burke |
| 2012/0050931 A1 | 3/2012 | Terry et al. |
| 2012/0068691 A1 * | 3/2012 | Ejury ................ G01R 19/0092 29/25.01 |
| 2012/0112543 A1 | 5/2012 | van Wageningen et al. |
| 2012/0150291 A1 | 6/2012 | Aber |
| 2012/0158074 A1 | 6/2012 | Hall |
| 2012/0212178 A1 | 8/2012 | Kim |
| 2012/0235633 A1 | 9/2012 | Kesler et al. |
| 2013/0069651 A1 | 3/2013 | Lumiani |
| 2013/0099585 A1 | 4/2013 | Von Novak et al. |
| 2013/0116575 A1 | 5/2013 | Mickle et al. |
| 2013/0178915 A1 * | 7/2013 | Radziemski ........ A61M 60/585 607/61 |
| 2013/0289334 A1 | 10/2013 | Badstibner |
| 2013/0303970 A1 | 11/2013 | Keenan et al. |
| 2014/0012282 A1 | 1/2014 | Fritsch |
| 2014/0028107 A1 * | 1/2014 | Kwon ..................... H02J 50/12 307/104 |
| 2014/0039587 A1 | 2/2014 | Romero |
| 2014/0063666 A1 | 3/2014 | Kallal et al. |
| 2014/0094645 A1 | 4/2014 | Lafontaine et al. |
| 2014/0104898 A1 | 4/2014 | Yeo et al. |
| 2014/0107754 A1 | 4/2014 | Fuhs et al. |
| 2014/0135884 A1 | 5/2014 | Tockman et al. |
| 2014/0194058 A1 | 7/2014 | Lee et al. |
| 2014/0233184 A1 | 8/2014 | Thompson et al. |
| 2014/0249603 A1 | 9/2014 | Yan et al. |
| 2014/0265620 A1 | 9/2014 | Hoarau et al. |
| 2014/0275727 A1 | 9/2014 | Bonde |
| 2014/0346884 A1 * | 11/2014 | Fujita .................... H02M 5/458 307/72 |
| 2015/0008755 A1 | 1/2015 | Sone |
| 2015/0028805 A1 | 1/2015 | Dearden et al. |
| 2015/0090372 A1 | 4/2015 | Branagan et al. |
| 2015/0196076 A1 | 7/2015 | Billingslea |
| 2015/0244166 A1 | 8/2015 | Chen |
| 2015/0290372 A1 | 10/2015 | Muller et al. |
| 2015/0290373 A1 * | 10/2015 | Rudser ................ A61M 60/538 623/3.27 |
| 2015/0333532 A1 | 11/2015 | Han et al. |
| 2015/0380972 A1 | 12/2015 | Fort |
| 2016/0022889 A1 | 1/2016 | Bluvshtein et al. |
| 2016/0067395 A1 | 3/2016 | Jimenez et al. |
| 2016/0081680 A1 | 3/2016 | Taylor |
| 2016/0087558 A1 * | 3/2016 | Yamamoto ................ H02P 3/18 318/563 |
| 2016/0095968 A1 | 4/2016 | Rudser |
| 2016/0175501 A1 | 6/2016 | Schuermann |
| 2016/0226296 A1 * | 8/2016 | Bae ............ H02J 5/00 |
| 2016/0268846 A1 | 9/2016 | Akuzawa et al. |
| 2016/0271309 A1 | 9/2016 | Throckmorton et al. |
| 2016/0331980 A1 | 11/2016 | Strommer et al. |
| 2016/0336811 A1 * | 11/2016 | Liu ....................... H02M 7/219 |
| 2016/0344302 A1 | 11/2016 | Inoue |
| 2017/0018967 A1 * | 1/2017 | Berkhout ................ H02J 50/12 |
| 2017/0043170 A1 * | 2/2017 | Guardiani ............ A61N 1/3787 |
| 2017/0047781 A1 | 2/2017 | Stanislawski et al. |
| 2017/0070082 A1 | 3/2017 | Zheng et al. |
| 2017/0136164 A1 | 5/2017 | Yeatts |
| 2017/0143977 A1 | 5/2017 | Kaib et al. |
| 2017/0202575 A1 | 7/2017 | Stanfield et al. |
| 2017/0203104 A1 | 7/2017 | Nageri et al. |
| 2017/0231717 A1 * | 8/2017 | Forsell ................... A61N 1/372 320/108 |
| 2017/0271919 A1 | 9/2017 | Von Novak, III et al. |
| 2017/0275799 A1 | 9/2017 | Chen |
| 2017/0288448 A1 | 10/2017 | Kranz et al. |
| 2017/0303375 A1 | 10/2017 | Woodhead |
| 2017/0353053 A1 | 12/2017 | Muratov |
| 2017/0354812 A1 | 12/2017 | Callaghan et al. |
| 2017/0361115 A1 * | 12/2017 | Aghassian ............ A61N 1/36142 |
| 2017/0361117 A1 * | 12/2017 | Aghassian ......... A61N 1/36125 |
| 2018/0078329 A1 | 3/2018 | Hansen et al. |
| 2018/0126053 A1 | 5/2018 | Zilbershlag et al. |
| 2018/0194236 A1 | 7/2018 | Elshaer et al. |
| 2018/0207336 A1 | 7/2018 | Solem |

(56) References Cited

U.S. PATENT DOCUMENTS

| | | | |
|---|---|---|---|
| 2018/0256796 A1 | 9/2018 | Hansen | |
| 2018/0256800 A1 | 9/2018 | Conyers et al. | |
| 2018/0269724 A1 | 9/2018 | Smith | |
| 2018/0269930 A1* | 9/2018 | Kwon | H04B 5/79 |
| 2018/0278099 A1* | 9/2018 | Hong | H02J 50/90 |
| 2018/0280708 A1 | 10/2018 | Escalona et al. | |
| 2018/0287405 A1 | 10/2018 | Govindaraj | |
| 2018/0316209 A1 | 11/2018 | Gliner | |
| 2019/0004037 A1 | 1/2019 | Zhang et al. | |
| 2019/0060543 A1 | 2/2019 | Khanal et al. | |
| 2019/0068004 A1 | 2/2019 | Louis | |
| 2019/0074726 A1 | 3/2019 | Hosotani | |
| 2019/0097447 A1 | 3/2019 | Partovi | |
| 2019/0120905 A1* | 4/2019 | Wong | H02M 3/158 |
| 2019/0175808 A1 | 6/2019 | Zilbershlag et al. | |
| 2019/0222064 A1 | 7/2019 | Du et al. | |
| 2019/0231523 A1 | 8/2019 | Lombardi | |
| 2019/0267913 A1* | 8/2019 | Lim | H02M 7/062 |
| 2019/0305613 A1 | 10/2019 | Oshima | |
| 2019/0344000 A1 | 11/2019 | Kushwaha et al. | |
| 2019/0351120 A1 | 11/2019 | Kushwaha et al. | |
| 2019/0393735 A1 | 12/2019 | Lee et al. | |
| 2020/0022811 A1 | 1/2020 | Griswold | |
| 2020/0023109 A1 | 1/2020 | Epple | |
| 2020/0028376 A1 | 1/2020 | Ha | |
| 2020/0054806 A1 | 2/2020 | Sun | |
| 2020/0136421 A1* | 4/2020 | Kim | H02J 50/12 |
| 2020/0139032 A1 | 5/2020 | Bryson et al. | |
| 2020/0227954 A1 | 7/2020 | Ding et al. | |
| 2020/0350812 A1 | 11/2020 | Vogt et al. | |
| 2020/0366121 A1* | 11/2020 | Guedon | H02J 50/10 |
| 2020/0373768 A1* | 11/2020 | Danilovic | H02J 50/80 |
| 2021/0052793 A1 | 2/2021 | Struthers et al. | |
| 2021/0057804 A1 | 2/2021 | Wenning | |
| 2021/0143688 A1 | 5/2021 | Agrawal et al. | |
| 2021/0290931 A1 | 9/2021 | Baumbach | |
| 2021/0290939 A1 | 9/2021 | Baumbach | |
| 2021/0322011 A1 | 10/2021 | Schuelke et al. | |
| 2021/0336484 A1* | 10/2021 | Araujo | H04B 5/79 |
| 2021/0351628 A1* | 11/2021 | Araujo | H04B 5/26 |
| 2021/0379360 A1 | 12/2021 | Schellenberg | |
| 2021/0386990 A1 | 12/2021 | Stotz et al. | |
| 2021/0393944 A1 | 12/2021 | Wenning | |
| 2021/0399582 A1* | 12/2021 | Vasconcelos Araujo | H02J 50/12 |
| 2022/0032036 A1* | 2/2022 | Baumbach | A61M 60/531 |
| 2022/0080184 A1 | 3/2022 | Clifton et al. | |
| 2022/0080185 A1 | 3/2022 | Clifton et al. | |
| 2022/0103023 A1* | 3/2022 | Govindaraj | H02J 7/0047 |
| 2022/0139614 A1* | 5/2022 | Diekhans | H01F 38/14 307/104 |
| 2022/0161021 A1* | 5/2022 | Mitze | A61M 60/839 |
| 2022/0166253 A1* | 5/2022 | Forsell | H02J 50/80 |
| 2022/0417673 A1* | 12/2022 | Narampanawe | H02J 7/00034 |
| 2023/0145482 A1 | 5/2023 | Garrigue | |
| 2023/0173250 A1* | 6/2023 | Stigloher | G01S 13/505 600/17 |
| 2023/0191141 A1* | 6/2023 | Wenning | A61N 1/37282 607/61 |
| 2023/0258694 A1* | 8/2023 | Vijayakumar | H04L 27/06 375/317 |
| 2023/0352236 A1 | 11/2023 | Diekhans et al. | |
| 2023/0381526 A1 | 11/2023 | Stotz et al. | |
| 2024/0186828 A1* | 6/2024 | Chu | H02M 1/08 |
| 2024/0269459 A1 | 8/2024 | Schellenberg et al. | |
| 2024/0312433 A1* | 9/2024 | Kim | G09G 3/32 |
| 2025/0134652 A1 | 5/2025 | Maiorano | |

FOREIGN PATENT DOCUMENTS

| | | |
|---|---|---|
| CN | 103 942 511 A | 7/2014 |
| CN | 104274873 | 1/2015 |
| CN | 104888293 | 3/2017 |
| CN | 106 776 441 A | 5/2017 |
| CN | 112168427 | 1/2021 |
| CN | 114886614 | 8/2022 |
| CN | 115916111 | 4/2023 |
| CN | 116271502 | 6/2023 |
| CN | 117959584 | 5/2024 |
| CN | 118717356 | 10/2024 |
| CN | 119033506 | 11/2024 |
| DE | 11 65 144 | 3/1964 |
| DE | 103 02 550 | 8/2004 |
| DE | 20 2005 020 288 | 6/2007 |
| DE | 10 2012 200 912 | 7/2013 |
| DE | 11 2012 005 944 | 12/2014 |
| DE | 20 2013 007 408 | 12/2014 |
| DE | 10 2016 106 683 | 10/2016 |
| DE | 10 2016 225 862 | 6/2017 |
| DE | 10 2016 203 172 | 8/2017 |
| DE | 10 2017 213 475 | 2/2019 |
| DE | 10 2018 204 604 | 10/2019 |
| DE | 10 2018 204 610 | 10/2019 |
| DE | 10 2018 206 714 | 11/2019 |
| DE | 10 2018 206 724 | 11/2019 |
| DE | 10 2018 206 725 | 11/2019 |
| DE | 10 2018 206 727 | 11/2019 |
| DE | 10 2018 206 731 | 11/2019 |
| DE | 10 2018 206 750 | 11/2019 |
| DE | 10 2018 206 754 | 11/2019 |
| DE | 10 2018 206 758 | 11/2019 |
| DE | 10 2018 222 505 | 6/2020 |
| EP | 0 930 086 | 7/1999 |
| EP | 2 752 209 | 7/2014 |
| EP | 2 782 210 | 9/2014 |
| EP | 2 859 911 | 4/2015 |
| EP | 2 966 753 | 1/2016 |
| EP | 2 454 799 | 9/2016 |
| EP | 2 709 689 | 4/2017 |
| EP | 3 220 505 | 9/2017 |
| EP | 3 378 421 | 9/2018 |
| EP | 3 536 360 | 9/2019 |
| EP | 3 357 523 | 1/2021 |
| EP | 3 423 126 | 2/2021 |
| EP | 3 490 628 | 2/2021 |
| EP | 3 198 677 | 3/2021 |
| EP | 3 248 647 | 3/2021 |
| EP | 3 436 106 | 3/2021 |
| EP | 3 509 661 | 3/2021 |
| EP | 3 528 863 | 3/2021 |
| EP | 3 436 105 | 4/2021 |
| EP | 3 116 407 | 5/2021 |
| EP | 3 131 600 | 6/2021 |
| EP | 3 827 876 | 6/2021 |
| EP | 2 608 731 | 7/2021 |
| EP | 2 599 510 | 10/2021 |
| EP | 3 077 018 | 10/2021 |
| EP | 3 485 936 | 10/2021 |
| EP | 3 539 613 | 2/2022 |
| EP | 2 858 718 | 3/2022 |
| EP | 3 624 867 | 3/2022 |
| EP | 3 755 237 | 4/2022 |
| EP | 3 497 775 | 7/2022 |
| EP | 3 711 788 | 8/2022 |
| EP | 2 654 883 | 9/2022 |
| EP | 3 485 819 | 9/2022 |
| EP | 3 600 477 | 10/2022 |
| EP | 3 808 408 | 11/2022 |
| EP | 3 858 422 | 11/2022 |
| EP | 2 892 583 | 1/2023 |
| EP | 3 597 231 | 1/2023 |
| EP | 3 856 275 | 1/2023 |
| EP | 3 003 420 | 2/2023 |
| EP | 3 946 511 | 4/2023 |
| EP | 3 826 104 | 5/2023 |
| JP | H11-178249 | 7/1999 |
| JP | 4706886 | 6/2011 |
| JP | 2013-013216 | 1/2013 |
| JP | 2018-046708 | 3/2018 |
| KR | 10-1185112 | 9/2012 |
| WO | WO 89/006513 | 1/1989 |
| WO | WO 2008/106103 | 9/2008 |
| WO | WO 2009/023905 A1 | 2/2009 |

(56) References Cited

FOREIGN PATENT DOCUMENTS

| | | |
|---|---|---|
| WO | WO 2009/029977 | 3/2009 |
| WO | WO 2010/042054 | 4/2010 |
| WO | WO 2011/007300 | 1/2011 |
| WO | WO 2012/147061 | 11/2012 |
| WO | WO 2013/164831 | 11/2013 |
| WO | WO 2015/152732 | 10/2015 |
| WO | WO 2017/021846 | 2/2017 |
| WO | WO 2017/060257 | 4/2017 |
| WO | WO 2017/066257 | 4/2017 |
| WO | WO 2017/089440 | 6/2017 |
| WO | WO 2017/118738 | 7/2017 |
| WO | WO 2017/165372 | 9/2017 |
| WO | WO 2017/213032 | 12/2017 |
| WO | WO 2017/218349 | 12/2017 |
| WO | WO 2018/033799 | 2/2018 |
| WO | WO 2018/078615 | 5/2018 |
| WO | WO 2018/100192 | 6/2018 |
| WO | WO 2019/025258 | 2/2019 |
| WO | WO 2019/025259 | 2/2019 |
| WO | WO 2019/025260 | 2/2019 |
| WO | WO 2019/101786 | 5/2019 |
| WO | WO 2019/118371 | 6/2019 |
| WO | WO 2019/145253 | 8/2019 |
| WO | WO 2019/158996 | 8/2019 |
| WO | WO 2019/183247 | 9/2019 |
| WO | WO 2019/185511 | 10/2019 |
| WO | WO 2019/185512 | 10/2019 |
| WO | WO 2019/211400 | 11/2019 |
| WO | WO 2019/211405 | 11/2019 |
| WO | WO 2019/211410 | 11/2019 |
| WO | WO 2019/211413 | 11/2019 |
| WO | WO 2019/211414 | 11/2019 |
| WO | WO 2019/211415 | 11/2019 |
| WO | WO 2019/211416 | 11/2019 |
| WO | WO 2019/229224 | 12/2019 |
| WO | WO 2019/234151 | 12/2019 |
| WO | WO 2019/241556 | 12/2019 |
| WO | WO 2019/244031 | 12/2019 |
| WO | WO 2020/089429 | 5/2020 |
| WO | WO 2023/040546 | 12/2021 |
| WO | WO 2023/076869 | 5/2023 |
| WO | WO 2023/112044 | 6/2023 |

OTHER PUBLICATIONS

International Search Report for International Application No. PCT/EP2019/061319 dated Aug. 16, 2019.

Atkinson et al., "Pulse-Doppler Ultrasound and Its Clinical Application", The Yale Journal of Biology and Medicine, 1977, vol. 50, pp. 367-373.

Leguy et al., "Assessment of Blood Volume Flow in Slightly Curved Arteries from a Single Velocity Profile", Journal of Biomechanics, 2009, pp. 1664-1672.

Murali, Akila, "Design of Inductive Coils for Wireless Power Transfer to Pediatric Implants", A graduate project submitted in partial fulfillment of the requirements for the degree of Master of Science in Electrical Engineering, California State University, Northridge, May 2018, pp. 37.

Sinha et al., "Effect of Mechanical Assistance of the Systemic Ventricle in Single Ventricle Circulation with Cavopulmonary Connection", The Journal of Thoracic and Cardiovascular Surgery, Apr. 2014, vol. 147, No. 4, pp. 1271-1275.

Vieli, A., "Doppler Flow Determination", BJA: British Journal of Anaesthesia, 1988, vol. 60, pp. 107S-112S.

HeartMate 3™ Left Ventricular Assist System, Instructions for Use, Thoratec Corporation, Aug. 2017, pp. 536. [Uploaded in 3 parts].

Chung et al., "Improved Efficiency Characteristics of Wireless Power Charging System for Superconducting MAGLEV Train Using Inserted Permanent Magnets," 2018 IEEE International Symposium on Electromagnetic Compatibility, 2018, pp. 564-567.

"ECG Electrodes product comparison chart," 3M.com, 2018, https://multimedia.3m.com/mws/media/14908830/red-dot-ecg-electrodes-comparison-chart.pdf, accessed May 18, 2025, 1 page.

Mack-Haynes, Robin, "Fasteners Made Easy," New Mexico State University, https://pubs.nmsu.edu/_c/C232.pdf, accessed May 18, 2025, pp. 8.

\* cited by examiner

Fig. 2

ENERGY TRANSFER SYSTEM AND RECEPTION UNIT FOR THE WIRELESS TRANSCUTANEOUS TRANSFER OF ENERGY

BACKGROUND

Field

The present invention relates to an energy transfer system with a transmitter unit and a receiver unit for wireless energy transfer and a receiver unit configured to interact for wireless energy transfer with a transmitter unit separate from the receiver unit.

Description of the Related Art

A wireless, in particular inductive, energy transfer can be used for the energy supply of loads and in particular for charging energy storage devices. This type of energy transfer can generate a magnetic field in a transmitter unit with a primary coil, said magnetic field inducing a voltage and thus a current flow in a receiver unit with a secondary coil.

A decisive point for an optimal and efficient energy transfer in such an energy transfer system is usually that the transmitter unit and the receiver unit are positioned as optimally as possible relative to one another. This relates in particular to the coils present therein. In case of insufficiently precise positioning, the energy transfer is generally not efficient, because the voltage induced in the secondary coil is too low.

A problem for optimizing the positioning of the transmitter unit and receiver unit relative to each other arises in particular for so-called transcutaneous energy transfer, wherein the receiver unit is arranged or implanted under the skin in a human body. Such transcutaneous energy transfer is advantageous, for example, for cardiovascular or cardiac support systems (so-called VAD systems, from English "Ventricular Assist Device"), because there is then no permanent wound in the skin through which a cable is guided. However, the implantation of the receiver unit under the skin means that the receiver unit is not visible and is usually not detectable or only difficult to detect, which makes it difficult to optimally position the transmitter unit.

For example, such an energy transfer system for wireless energy transfer is known from CN 103 942 511 A, wherein infrared or wireless technology are proposed for better positioning. WO 2009/023905 A1 proposes, for example, the use of magnets to better position the transmitter unit relative to the receiver unit. It is known from CN 106 776 441 A that NFC chips (NFC is the English abbreviation for "Near Field Communication") are used for this purpose. U.S. Pat. No. 6,212,430 B1 proposes a free positioning using a coil arrangement.

SUMMARY

It is the task of the invention to simplify the correct positioning of a transmitter unit for the inductive transfer of electrical energy to a receiver unit of an energy transfer system arranged in the body of a person.

This task is achieved by the energy transfer system described herein and the receiver unit described herein. Advantageous embodiments of the invention are described herein.

The invention is based upon an energy transfer system for wireless energy transfer with a transmitter unit and a receiver unit separate from the transmitter unit. In particular, the receiver unit is thus configured to interact for wireless energy transfer with a transmitter unit separate from the receiver unit. The transmitter unit comprises a primary coil that can be supplied with a predetermined supply voltage. For this purpose, an inverter, for example with suitable semiconductor switches, is generally also specified in order to generate an oscillation of the voltage in the primary coil with a supply voltage present as a direct current voltage. A magnetic alternating field can thus be generated by means of the transmitter unit.

The receiver unit correspondingly comprises a secondary coil, to which a DC link capacitor or generally a DC link capacitance is connected using a rectifier. The rectifier can be, in particular, a passive rectifier with suitable diodes. However, an active rectifier for example with suitable semiconductor switches is also advantageous. The DC link capacitor, which is charged during energy transfer, is used in particular for smoothing the alternating current that is induced in the secondary coil and then rectified. As mentioned above, this type of wireless energy transfer is an inductive energy transfer.

A load can then, for example, be connected to the rectifier that is supplied with voltage and thus with energy by means of a DC link voltage on the DC link circuit or the DC link capacitor or by means of a voltage derived therefrom using a second stage (e.g. a buck converter). Additionally or alternatively, an energy storage unit, for example a storage battery or a rechargeable battery, that can be or is to be charged by means of wireless or inductive energy transfer can be connected after the rectifier, in particular using a second stage (e.g. a buck converter).

According to the invention, it is specified that the energy transfer system is configured to determine a value of the DC link voltage applied on the DC link capacitor when the supply voltage is applied on the primary coil and to perform at least one predetermined function based on the determined value of the DC link voltage. It is, in this case, particularly preferred when the receiver unit is configured as a part or component of the energy transfer system to perform these steps or processes. At least the DC link voltage should be detected in the receiver unit.

However, it is also conceivable that individual steps or operations are performed in the transmitter unit and/or another additional component. For this purpose, a wireless signal transfer may be required.

The efficiency or effectiveness of the energy transfer from the transmitter unit to the receiver unit is determined by the so-called coupling factor. The coupling factor is a metric for the magnetic interaction between the primary coil and the secondary coil, which in particular also depends on the positioning of the two coils relative to one another. The higher the coupling factor, the better or more efficient the energy transfer. The invention now makes use of the fact that the coupling factor can be determined or calculated from the DC link voltage on the DC link capacitor or its value for known inductances of the primary and the secondary coil, any design parameters of the transmitter unit and/or receiver unit, and for a known supply voltage of the primary coil.

Because the coupling factor is a metric for the relative position of the primary and secondary coil and thus of the transmitter unit and the receiver unit to each other, a metric for the accuracy of the positioning can be obtained from the transmitter unit relative to the receiver unit by determining or measuring the DC link voltage. A specific function can then be carried out in the receiver unit depending on the current positioning of the transmitter unit relative to the receiver unit. In this context, it is also expedient for the determined value of the DC link voltage to be used to determine a coupling factor between the primary coil and the secondary coil as a value derived from the DC link voltage, and for the at least one predetermined function to then be carried out based on the determined coupling factor.

It is particularly preferred when the at least one function comprises outputting a signal, e.g. an optical signal or a vibration signal, in particular an acoustic signal, when the determined value of the DC link voltage or a value derived therefrom is below a predetermined first threshold value. In this way, a user can then recognize that the transmitter unit is not yet optimally positioned relative to the receiver unit. In this context, it is also expedient for the at least one function to comprise the outputting of at least one further different signal when the determined value of the DC link voltage or the value derived therefrom is below a predetermined second threshold value different from the first threshold value. In this way, it is possible to give a user feedback regarding the accuracy of the positioning. For example, a signal that comprises or results in a slow beep or a low tonal range can then be output when the transmitter unit is poorly positioned. When the transmitter unit is positioned better, but not yet optimally, a signal can be output that includes or results in a faster beeping or a higher tonal range.

However, it is also advantageous for the energy transfer system to be configured in order to continuously or repeatedly determine the value of the DC link voltage and to vary the signal depending on the determined value of the DC link voltage or the value derived therefrom. In this way, even more detailed feedback regarding the current position can be given to a user. For example, the signal can be varied such that a beep becomes incrementally faster the better the transmitter unit is positioned. It goes without saying that the type of variation of the signal can also be configured in addition to or alternatively to the beep frequency, for example with regard to the tonal range and/or volume, etc.

Preferably, the at least one function comprises supplying energy to a load connected to the rectifier and/or charging an energy storage device connected to the rectifier when the determined value of the DC link voltage or a value derived therefrom is above a predetermined third threshold value. The energy storage device can be, for example, a storage battery or a rechargeable battery. The wireless energy transfer can then, in particular, be started automatically when the transmitter unit is optimally or at least sufficiently precisely positioned. The third threshold value used for this purpose can, in particular, also be identical to the mentioned first or second threshold value.

In this context, it is also preferable for the energy transfer system to be configured in order to not supply the load with energy and/or to not charge the energy storage device as long as the determined value of the DC link voltage or the value derived therefrom is below the predetermined third threshold value. Although an overlap between the signal that indicates an insufficiently precise positioning and the charging or the energy supply is possible, an inefficient energy transfer is nevertheless avoided, especially when the positioning of the transmitter unit is not yet completed.

Although the proposed energy transfer system with transmitter unit and receiver unit is advantageous for any type of wireless or inductive energy transfer, is it nevertheless particularly expedient for the receiver unit to be configured to be arranged, in particular implanted, underneath the skin in a human or animal body and/or for the transmitter unit to be designed to be arranged on the skin outside of a human or animal body. The energy transfer system thus serves the aforementioned purpose of transcutaneous energy transfer. Here, the aforementioned advantages are particularly clearly relevant, because—as mentioned—positioning the receiver unit under the skin is particularly difficult. The acoustic signal is also expedient in this case.

The subject matter of the invention is furthermore a method for positioning the transmitter unit relative to the receiver unit in an energy transfer system according to the invention. The transmitter unit is initially positioned and then repositioned or not repositioned depending on the determined value of the DC link voltage or a value derived therefrom. In particular, as already shown in the above discussion, the transmitter unit can be repositioned until the value of the DC link voltage or the value derived therefrom exceeds the first threshold value, which can for example be communicated by a signal, in particular an acoustic signal. The energy transfer can then be started, in particular automatically or automated.

Further features and embodiments of the invention are disclosed in the following description and the enclosed drawing.

The invention is shown schematically based on an exemplary embodiment in the drawing and is described below with reference to the drawing.

DETAILED DESCRIPTION

Figure 1:
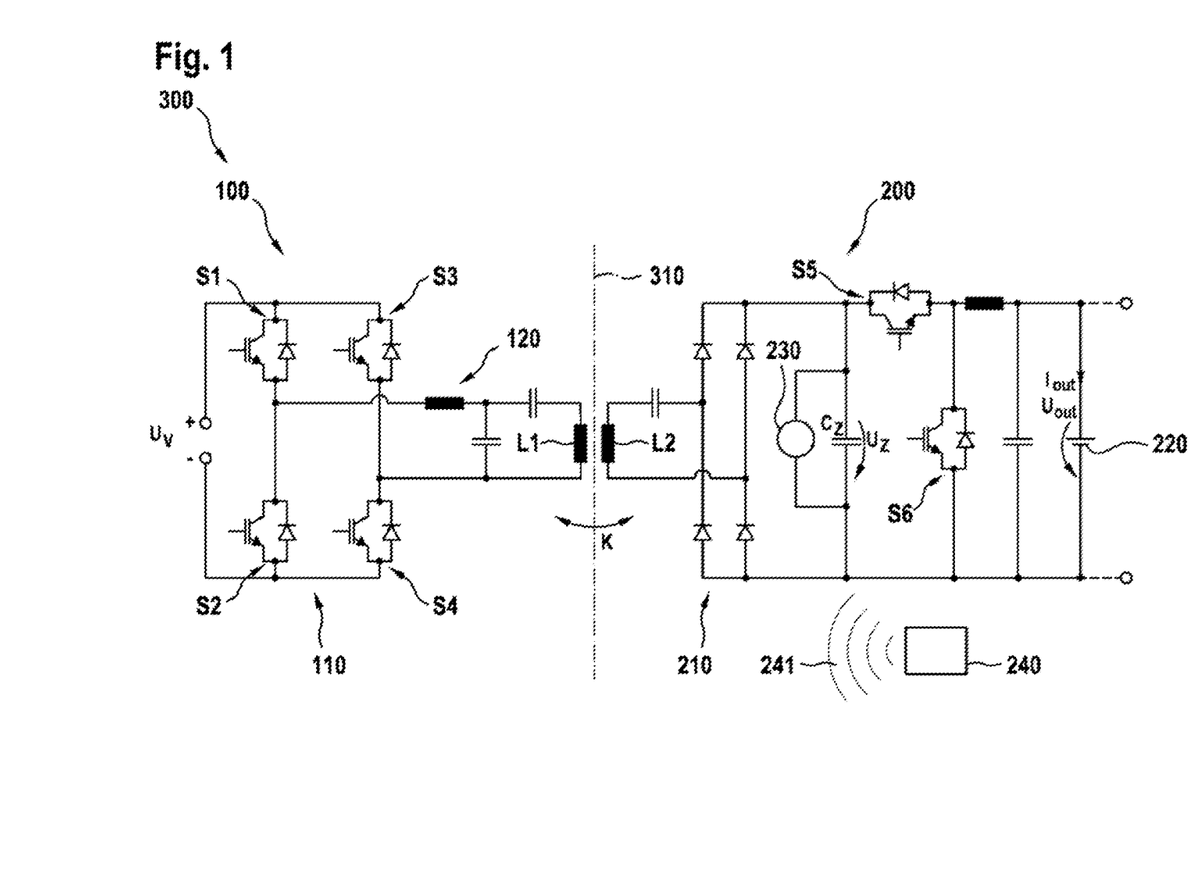
FIG. 1 shows a schematic representation of an energy transfer system according to the invention in a preferred embodiment.

FIG. 1 shows a schematic representation of an energy transfer system 300 according to the invention for wireless energy transfer in a preferred embodiment. The energy transfer system has a transmitter unit 100 and a receiver unit 200 according to the invention separate therefrom.

The transmitter unit 100 comprises a primary coil $L_1$, to which an inverter 110 can supply a voltage $U_v$, said inverter having four semiconductor switches, for example MOSFETs or bipolar transistors, designated as $S_1$ to $S_4$. In addition, a pre-filter 120 with unspecified components and a compensation capacitance are arranged between the inverter 110 and the primary coil $L_1$. The compensation capacitance is used for resonant actuation (actuation with the design frequency) as reactive power compensation.

When the voltage $U_v$ is applied and the inverter is suitably actuated, an alternating magnetic field can thus be generated by means of the coil $L_1$.

The receiver unit 200 has a secondary coil $L_2$ to which a DC link capacitor $C_z$ is connected using a compensation capacitance and a rectifier 210. In turn, an energy storage unit 220 is connected to the DC link capacitor $C_z$ by means of two semi-conductor switches $S_5$ and $S_6$, which can for example be configured as MOSFETs or bipolar transistors, and together with an inductance and a capacitance act as a buck converter, in particular. A load can be connected, for example, on the indicated connections. An output voltage $U_{out}$ with an output current $I_{out}$ can be set on the energy storage unit 220, for example by using the mentioned buck converter.

The rectifier 210 is designed as a passive rectifier with four diodes, which are not further specified. However, use of an active rectifier with, for example, semiconductor switches is also conceivable. The energy storage unit 220 can be a storage battery or a rechargeable battery, in particular.

The receiver unit 200 can now in particular be configured to be arranged or implanted underneath the skin, indicated here as 310, and used for a cardiac or ventricular support system, for example. In particular, the energy storage unit 220 can be used for the energy supply of such a cardiac or ventricular support system.

With the transmitter unit 100 positioned correspondingly outside or on the skin 310, and assuming corresponding positioning, a coupling is achieved between the primary coil $L_1$ of the transmitter unit 100 and the secondary coil $L_2$ of the receiver unit 200. This coupling is designated with a coupling factor K.

If the transmitter unit is now actuated or operated in such a way that an alternating magnetic field is generated by means of the primary coil $L_1$, the coupling induces a voltage or current flow in the secondary coil $L_2$. This, in turn, causes the DC link capacitor $C_z$ to be charged, so that a voltage $U_z$ is applied thereto.

For the energy transfer system 300 shown, the stationary relationship between the various already mentioned variables can be illustrated as follows, based on the selected topology (parallel compensation in the transmitter unit and serial compensation in the receiver unit):

$$\frac{U_Z}{U_V} = \frac{K}{A}\sqrt{\frac{L_2}{L_1}}.$$

Here, A represents a determinable or specifiable design parameter of the pre-filter 120 in the transmitter unit 100.

The aforementioned context thus shows that the coupling factor K can be determined or calculated for a known supply voltage $U_v$, known inductances $L_1$ and $L_2$ of the two coils, and known design parameters from the DC link voltage $U_z$.

The energy transfer system 300, in particular the receiver unit 200, is now configured to detect or determine a value of a DC link voltage $U_z$ applied on the DC link capacitor $C_z$ when the supply voltage $U_v$ is applied on the primary coil $L_1$, for which a voltage measuring device 230 is used in the present case.

Furthermore, a computing and control unit 240 is specified, which can be part of the receiver unit 200 and is configured to calculate the coupling factor K based on the determined value of the DC link voltage $U_z$ and, as a predetermined function, output for example an acoustic signal 241 as needed. For example, a suitable loudspeaker can be integrated for this purpose.

Alternatively, the steps of calculating the coupling factor K and outputting the acoustic signal can also take place in the transmitter unit when, for example, the receiver unit transmits the determined value of the DC link voltage $U_z$ to the transmitter unit.

If the value of the DC link voltage $U_z$ or the coupling factor K is below a predetermined threshold value, the acoustic signal 241 can then be output. As soon as this threshold value is exceeded—whether already due to an initial positioning of the transmitter unit 100 or after repositioning—the output of the acoustic signal can be stopped and a charging process of the energy storage device 220 can be started instead. For this purpose, the semiconductor switches $S_5$ and $S_6$ can, for example, be appropriately controlled by means of the computing and control unit 240.

Figure 2:
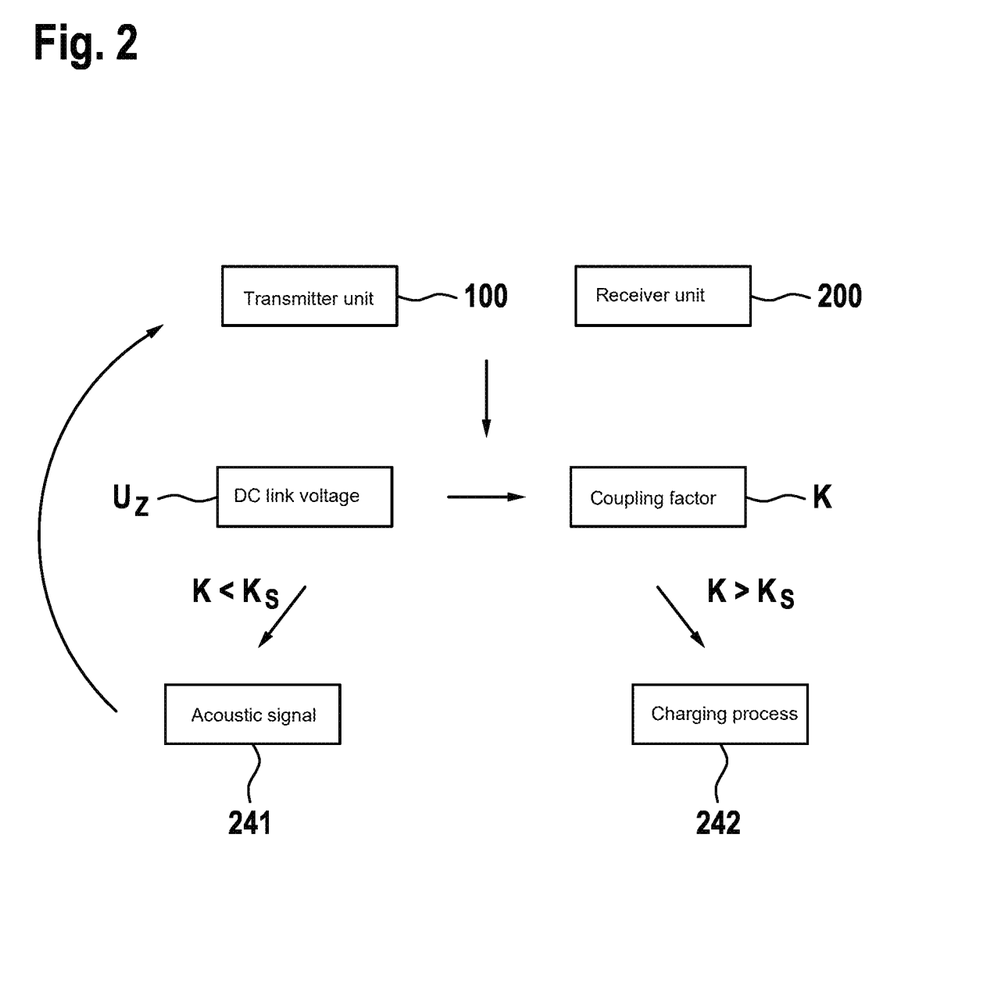
FIG. 2 shows a schematic representation of a sequence of a method according to the invention in a preferred embodiment.

FIG. 2 schematically shows a sequence of a method according to the invention in a preferred embodiment. Firstly, the transmitter unit 100 is initially positioned relative to the receiver unit 200. Next, the transmitter unit generates an alternating field by correspondingly controlling the inverter (switches $S_1$ to $S_4$). The DC link voltage $U_z$ is then determined subsequently—or even continuously or repeatedly—from which the coupling factor K is then calculated.

When and for as long as the coupling factor K is less than a predetermined first threshold value $K_s$, an acoustic signal 241 is output, whereupon the transmitter unit 100 is repositioned. If the coupling factor K is greater than a predetermined third threshold value, which in the present example corresponds to the first threshold value $K_s$, no acoustic signal is output, rather a charging process 242 is carried out for charging the energy storage unit. The charging process is started by corresponding activation of switches $S_5$ and $S_6$.

In summary, the following preferred features of the invention should in particular be noted:

The invention relates to an energy transfer system 300 for wireless energy transfer with a transmitter unit 100 and a receiver unit 200 separate from the transmitter unit, wherein the transmitter unit 100 has a primary coil $L_1$ that can be supplied with a specified supply voltage $U_v$, and wherein the receiver unit 200 has a secondary coil $L_2$ to which a DC link capacitor $C_z$ is connected using a rectifier 210, wherein the energy transfer system 300 is configured to determine a value of a DC link voltage $U_z$ applied on the DC link capacitor when a supply voltage $U_v$ is applied on the primary coil $L_1$, and to perform at least one predetermined function based on the determined value of the DC link voltage.

In summary, the following preferred features of the invention should be noted, in particular:

The invention relates to an energy transfer system 300 for wireless energy transfer with a transmitter unit 100 and a receiver unit 200 separate from the transmitter unit, wherein the transmitter unit 100 has a primary coil $L_1$ that can be supplied with a predetermined supply voltage $U_v$, and wherein the receiver unit 200 has a secondary coil $L_2$ to which a DC link capacitor $C_z$ is connected using a rectifier 210. The energy transfer system 300 comprises a device 230 designed to determine a value of a DC link voltage $U_z$ applied on the DC link capacitor $C_z$ when the supply voltage $U_z$ is applied on the primary coil $L_1$ and a device 240 designed to perform at least one predetermined function based on the determined value of the DC link voltage $U_z$ or a variable K derived therefrom.

The invention also relates to a receiver unit 200 configured to interact for wireless energy transfer with a transmitter unit 100 separate from the receiver unit, said transmitter unit 100 having a primary coil $L_1$ that can be supplied with a predetermined supply voltage $U_v$, wherein the receiver unit 200 has a secondary coil $L_2$ to which a DC link capacitor $C_z$ is connected using a rectifier 210. The receiver unit contains a device 230 designed to determine a value of a DC link voltage $U_z$ applied on the DC link capacitor $C_z$ when a supply voltage $U_v$ is applied on the primary coil $L_1$, and a device 240 designed to perform at least one predetermined function based on the determined value of the DC link voltage $U_z$ or a variable K derived therefrom.

The device 230 and the device 240 can each be arranged separately from one another or can be integrated into one another.

The invention relates, in particular, to the aspects specified in the following clauses:

1. Energy transfer system (300) for wireless energy transfer with a transmitter unit (100) and a receiver unit (200) separate from the transmitter unit,
   wherein the transmitter unit (100) comprises a primary coil ($L_1$) that can be supplied with a predetermined supply voltage ($U_v$) and wherein the receiver unit (200) comprises a secondary coil ($L_2$) to which a DC link capacitor ($C_z$) is connected using a rectifier (210),
   characterized in that
   the energy transfer system (300) is configured to determine a value of a DC link voltage ($U_z$) applied on the DC link capacitor ($C_z$) when the supply voltage ($U_v$) is applied on the primary coil ($L_1$) and to perform at least one predetermined function based on the determined value of the DC link voltage or a variable (K) derived therefrom.
2. Energy transfer system (300) according to aspect 1, characterized in that the at least one function comprises the outputting of a signal (241), in particular an acoustic signal, when the determined value of the DC link voltage or the variable (K) derived therefrom is below a predetermined first threshold value ($K_s$).
3. Energy transfer system (300) according to aspect 2, characterized in that the at least one function comprises the outputting of at least one additional different signal when the determined value of the DC link voltage or the variable (K) derived therefrom is below a predetermined second threshold value different from the first threshold value.
4. Energy transfer system (300) according to aspect 2 or 3, characterized in that the energy transfer system is configured to determine the value of the DC link voltage continuously or repeatedly, and wherein the at least one function comprises the varying of the signal (241) depending on the determined value of the DC link voltage or the variable (K) derived therefrom.
5. Energy transfer system (300) according to any of the above aspects, characterized in that the at least one function comprises the supplying of energy to a load connected to the rectifier (210) and/or to charge an energy storage unit (220) connected to the rectifier (210) when the determined value of the DC link voltage or the variable (K) derived therefrom is above a predetermined third threshold value ($K_s$).
6. Energy transfer system (300) according to aspect 5, characterized in that the energy transfer system is configured to not supply the load with energy and/or to not charge the energy storage unit (220) for as long as the determined value of the DC link voltage or the variable (K) derived therefrom is below the predetermined third threshold value ($K_s$).
7. Energy transfer system (300) according to any of the above aspects, characterized in that the energy transfer system is configured to determine a coupling factor (K) between the primary coil ($L_1$) and the secondary coil ($L_2$) from the determined value of the DC link voltage and to perform the at least one predetermined function based on the determined coupling factor.
8. Energy transfer system (300) according to any of the above aspects, characterized in that the receiver unit (200) is configured to determine the DC link voltage ($U_z$) applied on the DC link capacitor ($C_z$) when the supply voltage ($U_v$) is applied on the primary coil ($L_1$) and to perform the at least one predetermined function based on the determined value of the DC link voltage.
9. Energy transfer system (300) according to any of the above aspects, characterized in that the receiver unit (200) is designed to be arranged underneath the skin (310) in a human body, and/or wherein the transmitter unit (100) is designed to be arranged on the skin (310) outside a human body.
10. Receiver unit (200) configured for wireless energy transfer to interact with a transmitter unit (100) separate from the receiver unit, said transmitter unit (100) comprising a primary coil ($L_1$) that can be supplied with a predetermined supply voltage ($U_v$), wherein the receiver unit (200) comprises a secondary coil ($L_2$) to which a DC link capacitor ($C_z$) is connected using a rectifier (210),
    characterized in that
    the receiver unit (200) is configured to determine a value of a DC link voltage ($U_z$) applied on a DC link capacitor ($C_z$) when the supply voltage ($U_v$) is applied on the primary coil ($L_1$) and to perform at least one predetermined function based on the determined value of the DC link voltage or a variable (K) derived therefrom.
11. Receiver unit (200) according to aspect 10, wherein the at least one function comprises the transfer of the determined value of the DC link voltage or the variable (K) derived therefrom to the transmitter unit.
12. Receiver unit (200) according to aspect 10 or 11 configured as a receiver unit (200) of an energy transfer system (300).

LIST OF REFERENCE SYMBOLS

100 Transmitter unit
110 Inverter
120 Pre-filter
200 Receiver unit
210 Rectifier
220 Energy storage unit/Energy storage
230 Voltage measuring device
240 Computing and control unit
241 Acoustic signal
242 Charging operation
300 Energy transfer system
310 Skin
A Design parameters
$C_z$ DC link capacitor
$I_{out}$ Output current
K Coupling factor
$K_s$ First threshold value
$L_1$ Primary coil
$L_2$ Secondary coil
$S_1$ to $S_6$ Semiconductor switch
$U_{out}$ Output voltage
$U_v$ Supply voltage
$U_z$ DC link voltage

The invention claimed is:
1. An energy transfer system for a cardiac support system comprising:
   a transmitter unit comprising a primary coil configured to be supplied with a supply voltage;
   a receiver unit configured to supply energy to the cardiac support system, the receiver unit comprising:
   a secondary coil;
   a DC link capacitor connected to the secondary coil by a rectifier; and a voltage measuring device configured to determine a value of a DC link voltage applied to the DC link capacitor when the supply voltage is supplied to the primary coil; and a control unit coupled to the receiver unit and configured to perform, based on the determined value of the DC link voltage or a variable derived therefrom, at least one function comprising:

outputting a first acoustic signal when the determined value of the DC link voltage or the variable derived therefrom is below a first threshold value;

outputting a second acoustic signal when the determined value of the DC link voltage of the variable derived therefrom is above the first threshold value and below a second threshold value, wherein the second acoustic signal differs from the first acoustic signal in at least one of a repetition frequency, tonal range, or volume; and discontinuing the second acoustic signal and outputting a switch signal to close a first switch to connect an energy storage unit to the rectifier upon detection of the determined value of the DC link voltage or the variable derived therefrom is above the second threshold value, wherein the second threshold value is higher than the first threshold value.

2. The system of claim 1, wherein the at least one function comprises outputting at least one additional signal different from the acoustic signal when the determined value of the DC link voltage or the variable derived therefrom is below a third threshold value different from the first threshold value.

3. The system of claim 1, wherein the voltage measuring device is configured to determine the value of the DC link voltage continuously or repeatedly, and wherein the at least one function comprises varying the acoustic signal depending on the determined value of the DC link voltage or the variable derived therefrom.

4. The system of claim 1, wherein the at least one function comprises supplying energy to a load connected to the rectifier or charging the energy storage unit connected to the rectifier when the determined value of the DC link voltage or the variable derived therefrom is above a threshold value.

5. The system of claim 4, wherein the control unit is configured to not supply the load with energy or to not charge the energy storage unit as long as the determined value of the DC link voltage or the variable derived therefrom is below the threshold value.

6. The system of claim 1, wherein the control unit is configured to determine a coupling factor between the primary coil and the secondary coil from the determined value of the DC link voltage, and wherein the control unit is configured to perform the at least one function based on the determined coupling factor.

7. The system of claim 6, wherein the coupling factor is a metric related to a relative position between the primary coil and the secondary coil.

8. The system of claim 1, wherein the receiver unit comprises the control unit.

9. The system of claim 1, wherein the receiver unit is configured to be arranged underneath the skin in a human body, and wherein the transmitter unit is configured to be arranged on the skin outside a human body.

10. A receiver unit configured to interact for wireless energy transfer with a transmitter unit separate from the receiver unit and to supply energy to a cardiac support system, the transmitter unit comprising a primary coil supplied with a supply voltage, the receiver unit comprising:

a secondary coil configured to interact with the primary coil of the transmitter unit;

a DC link capacitor connected to the secondary coil by a rectifier;

a voltage measuring device configured to determine a value of a DC link voltage applied to the DC link capacitor when the supply voltage is supplied to the primary coil; and a control unit configured to perform, based on the determined value of the DC link voltage or a variable derived therefrom, at least one function comprising:

outputting a first acoustic signal when the determined value of the DC link voltage or the variable derived therefrom is below a first threshold value;

outputting a second acoustic signal when the determined value of the DC link voltage of the variable derived therefrom is above the first threshold value and below a second threshold value, wherein the second acoustic signal differs from the first acoustic signal in at least one of a repetition frequency, tonal range, or volume; and discontinuing the second acoustic signal and outputting a switch signal to close a first switch to connect an energy storage unit to the rectifier the determined value of the DC link voltage or the variable derived therefrom is above the second threshold value, wherein the second threshold value is higher than the first threshold value.

11. The receiver unit of claim 10, wherein the at least one function comprises outputting of at least one additional signal different from the acoustic signal when the determined value of the DC link voltage or the variable derived therefrom is below a second threshold value different from the first threshold value.

12. The receiver unit of claim 10, wherein the voltage measuring device is configured to determine the value of the DC link voltage continuously or repeatedly, and wherein the at least one function comprises varying the acoustic signal depending on the determined value of the DC link voltage or the variable derived therefrom.

13. The receiver unit of claim 10, wherein the at least one function comprises supplying energy to a load connected to the rectifier and/or charging the energy storage unit connected to the rectifier when the determined value of the DC link voltage or the variable derived therefrom is above a threshold value.

14. The receiver unit of claim 13, wherein the control unit is configured to not supply the load with energy or to not charge the energy storage unit for as long as the determined value of the DC link voltage or the variable derived therefrom is below the threshold value.

15. The receiver unit of claim 13, wherein the energy storage unit is connected to the rectifier via a buck converter.

16. The receiver unit of claim 10, wherein the control unit is configured to determine a coupling factor between the primary coil and the secondary coil from the determined value of the DC link voltage or the variable derived therefrom, and wherein the control unit is configured to perform the at least one function based on the determined coupling factor.

* * * * *